(No Model.) 2 Sheets—Sheet 1.
W. H. BURNHAM & J. H. MILLER.
WINDMILL TOWER.
No. 490,267. Patented Jan. 24, 1893.
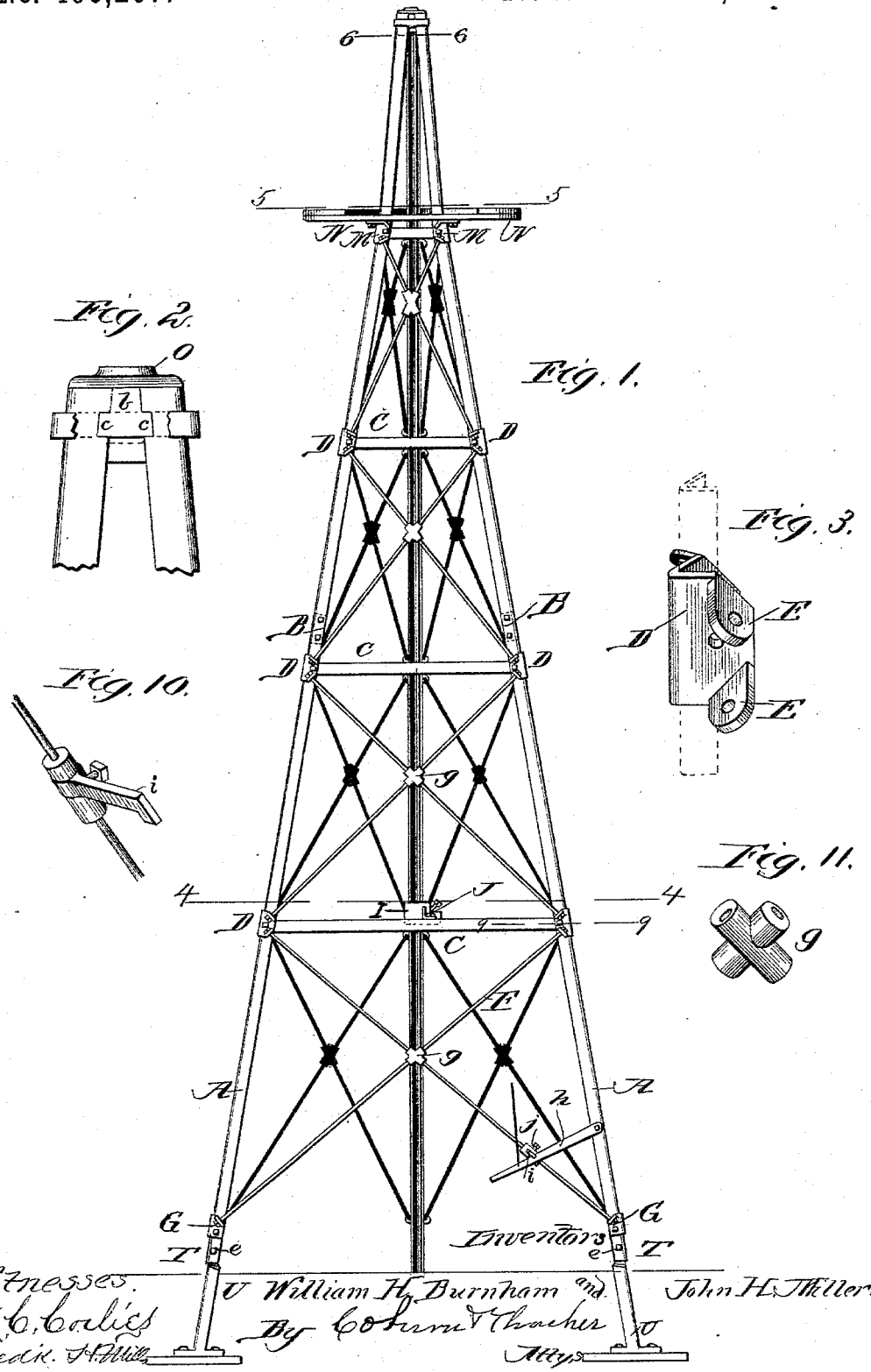

(No Model.) 2 Sheets—Sheet 2.
W. H. BURNHAM & J. H. MILLER.
WINDMILL TOWER.
No. 490,267. Patented Jan. 24, 1893.
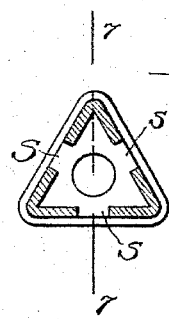
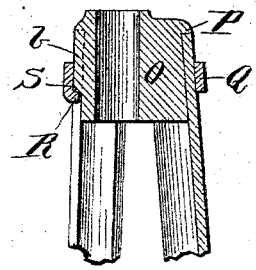
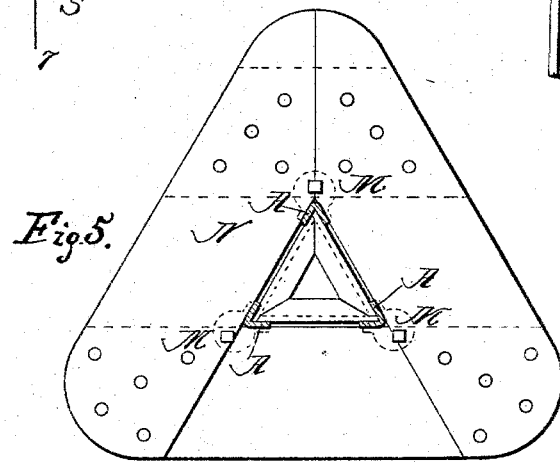
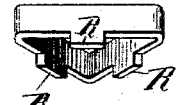
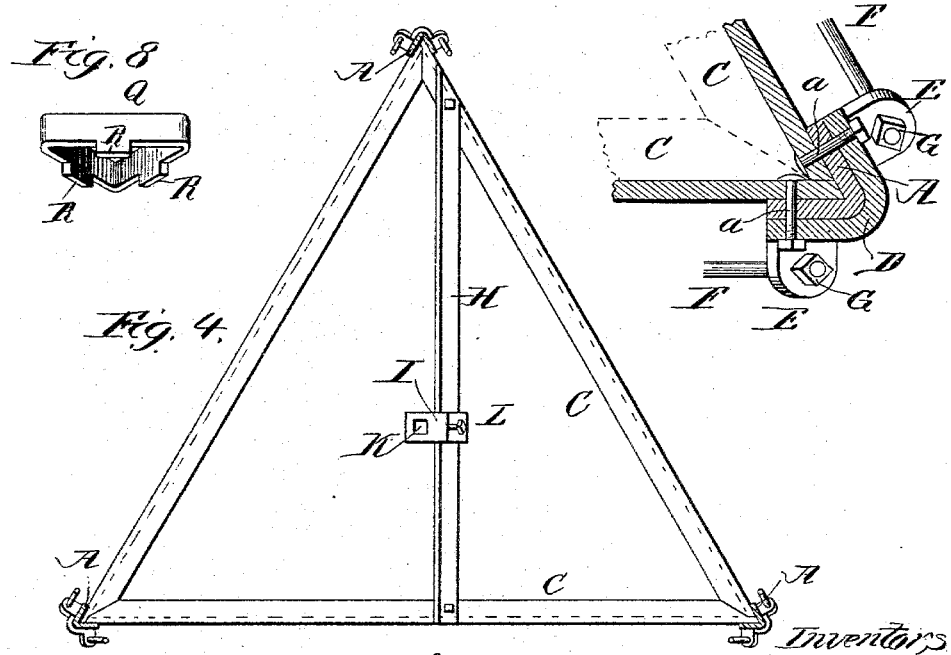
Witnesses.
W. C. Colies
Fredk. H. Wills.
Inventors
William H. Burnham and John H. Miller
By Coburn & Thacher
Attys
THE NORRIS PETERS CO., PHOTO-LITHO., WASHINGTON, D. C.

UNITED STATES PATENT OFFICE.

WILLIAM H. BURNHAM AND JOHN. H. MILLER, OF BATAVIA, ILLINOIS, ASSIGNORS TO THE UNITED STATES WIND ENGINE AND PUMP COMPANY, OF SAME PLACE.

WINDMILL-TOWER.

SPECIFICATION forming part of Letters Patent No. 490,267, dated January 24, 1893.

Application filed September 23, 1891. Serial No. 406,581. (No model.)

*To all whom it may concern:*

Be it known that we, WILLIAM H. BURNHAM and JOHN. H. MILLER, citizens of the United States, residing at Batavia, in the county of Kane and State of Illinois, have invented a certain new and useful Improvement in Windmill-Towers, which is fully set forth in the following specification, reference being had to the accompanying drawings, in which—

Figure 1 is a side elevation of our tower, complete. Fig. 2, a side elevation of a detached portion of the top of the tower, showing a portion of the outside ring cut away. Fig. 3, a perspective view of one of the angle-irons, showing the lugs to which the brace-rods are attached. Fig. 4 is a horizontal sectional view of the tower, taken at the line 4—4, Fig. 1. Fig. 5 is a horizontal sectional view, taken at the line 5—5, Fig. 1, looking down. Fig. 6 is a transverse sectional view, taken at the line 6—6, Fig. 1, looking up. Fig. 7 is a vertical sectional view of the top portion of the tower, taken at the line 7—7, Fig. 6. Fig. 8 is a perspective view of the top band of the tower. Fig. 9 is a detached view of a portion of the tower, showing the connection of the cross-braces. Fig. 10 is a perspective view of a portion of one of the brace-rods, F, showing the bracketed clamp on the brace-rod; and, Fig. 11 is a perspective view of the brace-rod iron for holding the brace-rods F in position where they cross.

The object of our invention is to make a metal tripod wind mill tower, of angle-iron metal; the corner angle-irons being made in sections, so that they can be readily transported and put together at the place of erection of the tower. To accomplish this purpose, we make the corner angle-irons of plate metal—preferably of steel-plate—bending the same to an angle of about sixty degrees, which makes the strongest form of tower, because the sixty degree angles form the corners of an equilateral triangle; all of the strain on the sides of the angle-iron corner pieces being in line of the plate-metal sides of the corner angle-iron posts..

A tripod angle-iron tower with the angle-iron posts, with cross-girts, and brace-rods. and with various devices for securing the various parts together, all as hereinafter specified, constitute the subject matter of our invention.

In the accompanying drawings, A represents the corner angle-iron posts or supports of the tower. These angle-iron posts are bent to an angle approximating sixty degrees, and are preferably of steel-plate metal, formed in the shape more clearly shown in Fig. 9. We fasten to the different lengths or sections of these corner angle-iron posts a short angle-iron, D, which we intend to cast of malleable iron, with lugs or ears, E, to which brace-rods are secured, as hereinafter specified. This angle-iron is of such shape as to receive on its inside the angle-iron posts A, to which they are securely bolted, as shown. The different sections or lengths of the corner posts are fastened together by a splicing angle-iron, placed on the inside of the corner angle-irons, the ends of the corner angle-irons resting against each other, and are held firmly in place by bolts passing through the splicing angle-iron, B.

C are angle-iron girts, the ends of which are constructed so as to fit into the inner angle of the corner angle-iron posts, as clearly shown in Fig. 9; and the bolts, *a*, which bolt the in place, pass through the angle-iron posts and the angle-irons, D, as clearly shown in the same figure.

F are brace-rods secured to the ears or lugs, E, on the angle-irons D, by means of nuts, G, by which they can be readily tightened or loosened. It will be observed that all of the strain that is brought to bear on the corner angle-iron posts A by these brace-rods F is in line with or in the same direction as the sides of the angle-iron, and the cross-brace girts C extend from corner post to corner post of the tripod tower, in line with the sides of the angle-iron posts, making the strongest form of bracing that can be given to a metal wind mill tower.

H, is a cross angle-iron, bolted to the angle-iron girts C, as clearly shown in Fig. 4. This angle-iron H carries a pump-rod guide-block, I. This block is cast with two openings through it; one opening shown at J, in Fig. 1, is of proper size and shape to receive the angle-iron H, while the vertical opening K is the shape of the pump-rod, and admits of the pump-rod vibrating vertically through it. This guide-block I is secured to the angle-iron H by means of a set-screw, L, which holds it in position. It must be slipped upon the angle-iron H before the angle-iron is bolted to the cross-girts C.

N is a platform, which is supported upon the ears or lugs, M, that are formed on the angle-iron firmly secured to the post A of the wind mill tower.

The turn-table, O, of the wind mill is cast or formed in such shape as to fit into the angles of the corner posts, and it has at its upper end a flange, P, which rests on the top of the corner angle-iron posts A of the tower. This turn-table O also projects between the corner angle-iron posts, which projections are shown at b, and they have also lateral projections, c, which fit in notches in the edge of the corner posts A, so that the turn-table is held by these lateral projections firmly between the upper ends of the angle-iron corner posts of the tower. We provide a band, Q, with downwardly projecting ears or lugs, R, which band fits over the outside of the upper ends of the corner angle-iron posts A, holding them firmly against the turn-table O; and this band is held in place by bending the ears or lugs R under the projections, b, of the turn-table, as clearly shown in Fig. 7, at S. The turn-table is thus securely held in place between the upper ends of the angle-iron posts A, and locked vertically, and the upper ends of the corner posts are also securely held in place and locked to the turn-table, so that the weight of the mill will not disconnect them from the turn-table, but be solidly supported on the corner posts.

The lower ends of the corner angle-iron posts A are supported on foot-posts U, which are formed of angle-irons, bent at about an angle approximating ninety degrees, but whose sides at the upper end are bent inwardly to an angle of about sixty degrees, thus forming a shoulder. The upper end of these foot-posts being bent inwardly to approximate an angle of about sixty degrees, the lower ends of the corner angle-iron posts A slip over them, and rest on the shoulder formed where their sides are bent inwardly. The bolts e are passed through them to hold the corner angle-iron posts A securely in place on the foot-posts, but the weight of the wind mill and tower does not rest entirely on these bolts, but partly on the shoulders formed, as above described, on the foot-posts, making a much more secure and stronger support than has heretofore been made. The brace-rods, F, cross each other, and in order to strengthen them and keep them firmly in position, we make two way cross-pipes, g, which serve as center ties for tying the rods together and strengthening them. These center ties must be slipped upon the brace-rods F before they are secured in position on the tower.

It is desirable to have a suitable stop or catch to hold the lever with which the wind mill is thrown out of gear, and we have devised a suitable stop for holding said lever. In Fig. 1 the lever is represented by h. The stop or catch i is slipped upon one of the brace-rods F, and secured in position by a set-screw, j. When the lever is thrown down to turn the wheel out of wind, it is swung under the projecting arm of the lever stop i. We have in this device a very simple lever-stop, which can be readily applied to our iron wind mill.

We were unable to find any rolling mills prepared to roll angle-iron sixty degrees, when we first commenced to manufacture our tripod wind mill tower, and upon investigation we are convinced that we were the first to have metal plate rolled at an angle of sixty degrees, suitable for making such tower as we have above described. We find it very important to have the angle of the corner post angle-irons about sixty degrees, which enables us to have the strain of the braces of said angle-iron corner posts in line with the web or sides of the angle-iron posts, making a very strong tower from light material.

We have been able, by the manufacture of new machinery, to provide ourselves with angle-iron corner posts bent at an angle of about sixty degrees, which enables us to made our tripod wind mill tower. We also make the center clips, with which we tie the brace-rods together firmly where they cross each other, by making the holes for the rods pass by each other, which causes the brace-rods, when tightened, to bend in slightly at the projecting ends of the center tie, thereby binding them in position and holding them firmly in place. We find that this construction of the center ties makes the rods perfectly tight in the center ties, although the hole through which the brace-rod passes may be a little larger in diameter than the brace-rod itself.

Having fully described the construction and operation of our invention, what we claim and desire to secure by Letters Patent, is:

1. In a wind mill tower, the angle-iron corner-posts A; the angle-iron brace-girts C, having beveled ends which fit together within the angles of the angle-iron posts; the brace-rod irons D, fitting on the outside of the angle-iron posts and provided with lugs E; the bolts a, bolting the brace-girts C, and angle-iron posts, and the brace-rod irons together; and the brace-rods F adjustably secured to the lugs E whereby the angle-iron corner-posts, angle-iron brace-girts, and brace-rods all co-operate through the instrumentality of the brace-rod irons, as specified.

2. In a wind mill tower constructed substantially as specified, the angle iron brace-girts C; the angle-iron H extending between the brace-girts and attached thereto; the pump-rod guide-block I, having two openings, one angular in form to fit upon the cross-angle iron H, and the other of the shape of a pump-rod, the guide-block being adjustable on the cross angle-iron H with means for securing it at any desired position; and the pump-rod; all substantially as specified.

3. In a wind mill tower, the corner angle-iron posts A, the turn-table O, supported on their upper ends and locked to the posts, and the band-iron Q, for holding the upper ends of the corner angle-iron posts firmly in place against the turn-table, as specified.

4. In a wind mill tower, the combination of the brace-rods F, the lever-stop $i$, adapted to be secured to one of the brace-rods F, and the lever $h$, substantially as specified.

5. In a wind mill tower, constructed substantially as specified, the combination of the brace-rods F, and the center tie $g$, for tying the brace-rods together and holding them in place, substantially as specified, 6. In a wind mill tower, constructed substantially as specified, the combination of the corner angle-iron posts A, and the foot-post U, the foot-post U having a shoulder near its upper end formed by lessening the angle at the upper end of the foot-post, the corner posts being adapted to pass over the upper end of the foot-post and rest on said shoulder, as specified.

WILLIAM H. BURNHAM.
JOHN. H. MILLER.

Witnesses:
T. W. SNOW,
C. D. WALWORTH.